Oct. 28, 1969  M. CAPPEL, JR., ET AL  3,475,721
DEEP WATER HOMING DEVICE
Filed April 30, 1968  7 Sheets-Sheet 1

INVENTORS:
MARVIN CAPPEL Jr
DAVID R. SUTTON
BY
M. Lee Helms
ATTORNEY

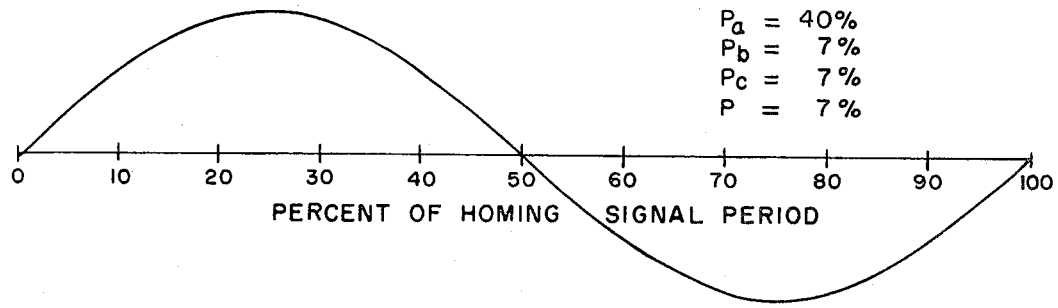
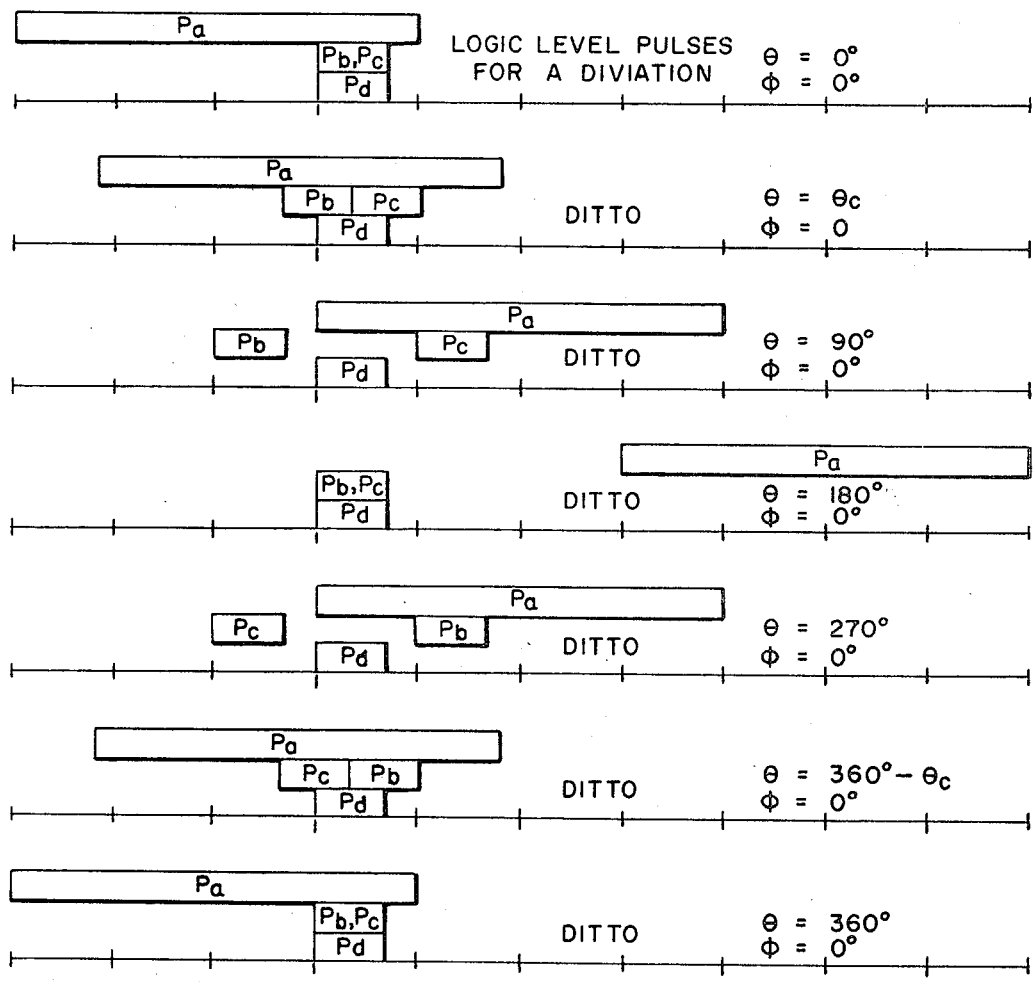

Oct. 28, 1969  M. CAPPEL, JR., ET AL  3,475,721
DEEP WATER HOMING DEVICE
Filed April 30, 1968  7 Sheets-Sheet 6
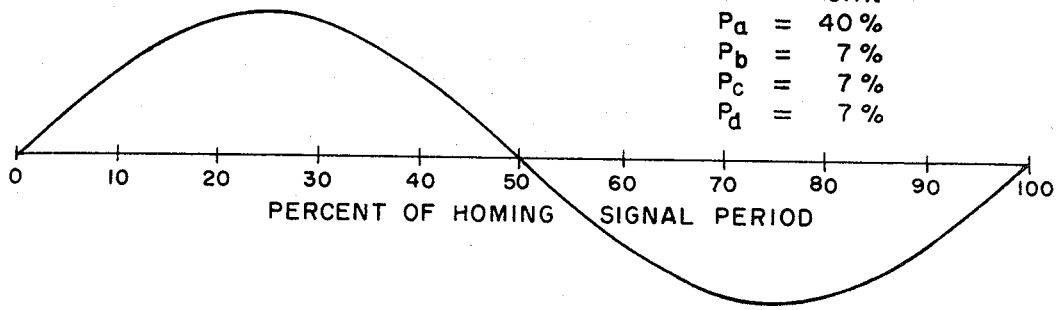
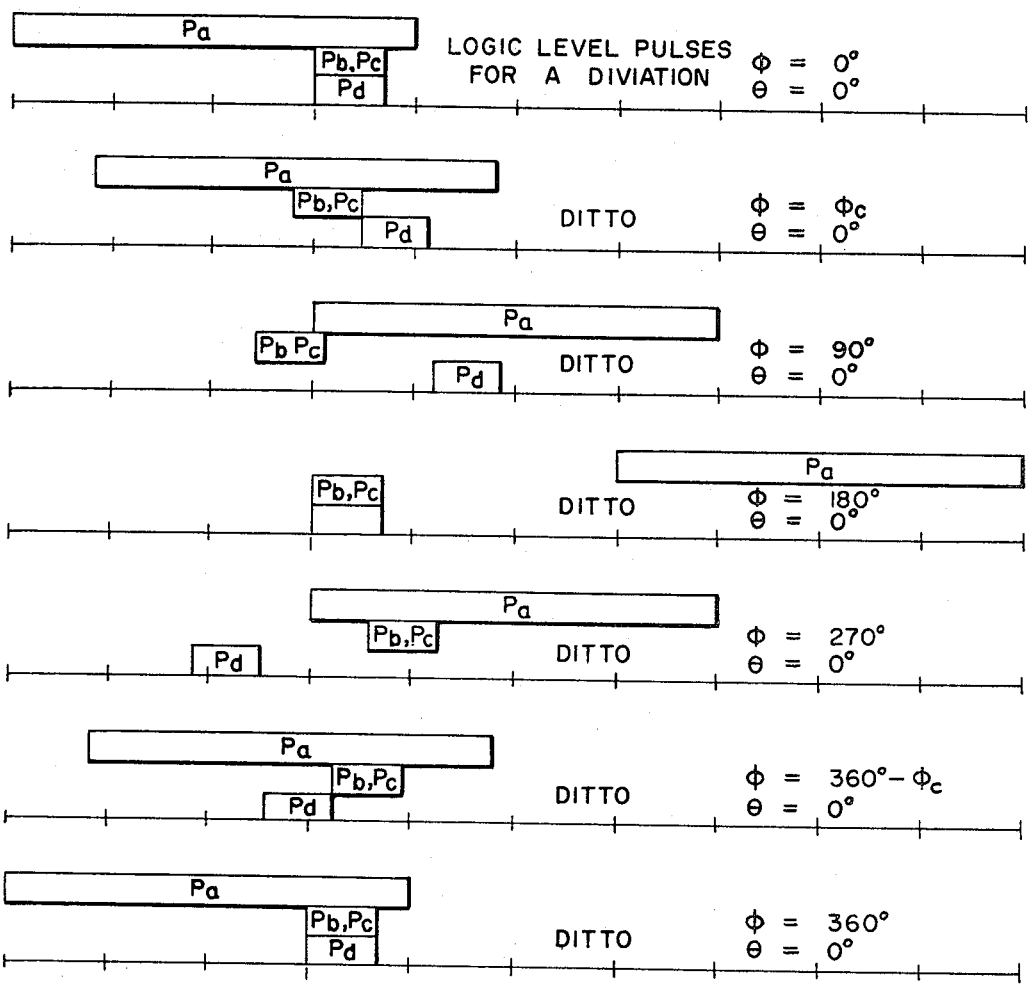

INVENTORS:
MARVIN CAPPEL Jr.
DAVID R. SUTTON
BY H. Lee Helms
ATTORNEY

United States Patent Office 3,475,721
Patented Oct. 28, 1969

3,475,721
DEEP WATER HOMING DEVICE
Marvin Cappel, Jr., and David R. Sutton, Jacksonville, Fla., assignors to Mason & Hanger-Silas Mason Co., Inc., Jacksonville, Fla.
Continuation-in-part of application Ser. No. 534,357, Mar. 15, 1966. This application Apr. 30, 1968, Ser. No. 725,435
Int. Cl. H04b 13/00; G01s 3/80
U.S. Cl. 340—6                                           1 Claim

ABSTRACT OF THE DISCLOSURE

An underwater direction finding device for response to an audio generated signal from a distant source, comprising a portable casing carrying battery energized sonic pick-ups, a first one at the forward end of the casing and three pick-ups rearwardly and laterally of the first pick-up and mutually spaced along lines of equal angles lying in a common plane and radiating in divergent directions from a line extending from said first pick-up longitudinally of the casing and intersecting the plane of the three rearwardly disposed microphones at right angles, in combination with a sequential-simultaneous logic network adapted for battery operation, including for each sonic pick-up, and in sequence, means for amplifying and maintaining the signal to detection amplitude, means for converting the signal into a pulse, means for fixing the pulse widths, followed in succession for each pick-up by means for mixing the plural pulse signals, a resettable time delay switch providing a continuous signal for a time equal to its delay, and an electronic switch providing an electronic path for the power required to operate a signal device carried by the casing.

---

This invention relates to an underwater direction finding system, primarily intended for use by divers to enable them to readily ascertain the directional location of an underwater or floating station. This application is a continuation-in-part of our application filed Mar. 15, 1966 Ser. No. 534,357, now abandoned.

Presently used direction finding systems are generally of the binaural or maximum amplitude types, which require a skilled operator and are not adaptable for use by SCUBA (self contained underwater breathing apparatus) equipped divers, who require maximum mobility. This invention employs three or more non-directional microphones or pick-ups, a sequential-simultaneous logic network, and an "on-course" indicator such as a rapidly flashing light or an audible signal, which alleviates the need for analytical decisions on the part of the user.

The direction finding unit is built using solid state miniature components and contains a battery power supply. Housing is sealed and of a material suitable to resist environmental effects. Both size and weight are a minimum for purposes of maximum utility by the diver.

In use, the diver directs the unit much like a person using a flashlight. When pointed in the direction of the home station, the "on-course" signal is activated.

At the station, an audio generator operating in the upper audible or lower ultra-sonic region and transmitting at a single discrete frequency is employed. Sound generation would be in essentially a spherical distribution pattern. No claim is made concerning this generator as it is a commonly used item.

The invention will be described with reference to the accompanying drawings, in which:

FIGURE 1 is a schematic view showing the positions of the microphones of the direction finder capable of both horizontal and vertical resolution.

FIGURE 1A is a schematic isometric view showing a further relative positioning of the microphones of the direction finder and a point "T" representing an audio generator. Microphone "B," "C," and "D" lie in the same plane and are equidistant from a point "O" in that plane. Lines "BO," "CO" and "DO" radiate from the center of the plane at 120° angles to one another. Microphone "A" lies on the axial line "AO" which intersects the plane "BCD" at right angles.

FIGURE 7 is a schematic view depicting the time period relationship of the logic level pulses generated by the electronic circuitry in response to audio signal reception as the direction finder is rotated through 360° in plan while the angle $\phi$ is held constant at 0° (i.e., about the line "DO" as axis of rotation).

FIGURE 8 is a schematic view depicting the time period relationship of the logic level pulses generated by the electronic circuitry in response to audio signal reception as the direction finder is rotated through 360° in elevation while the angle $\theta$ is held constant at 0° (i.e., about a line through the point "O" parallel to the line "BC" as axis of rotation).

Figure 1:
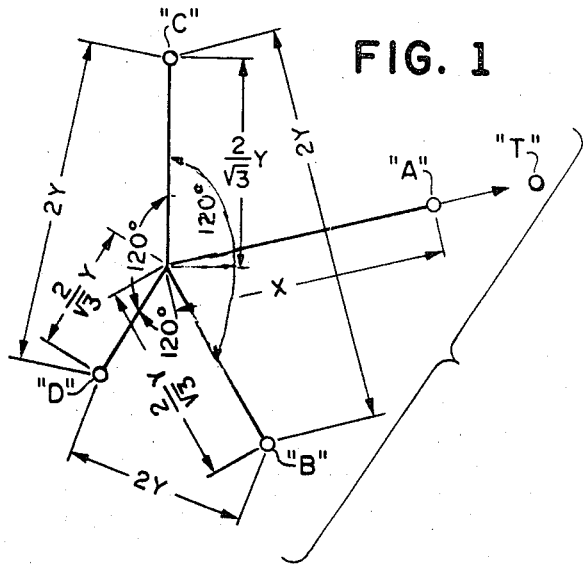
Figure 1A:
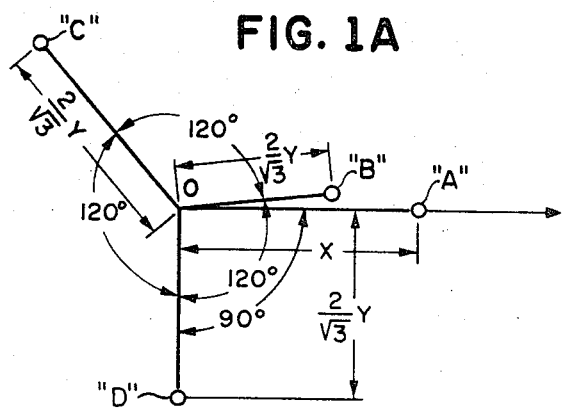

Four audio pick-ups or microphones are arranged in a general configuration as depicted in FIGURES 1 and 1A for a direction finder which is capable of resolving the direction to an audio generator regardless of its location providing it is within range of the radiated sonic signal.

Referring to FIGURE 1A, consider that a sonic signal of λ wave-length (in sea water) is generated at Point "T." In order for the direction finder to give an "on-course" signal, it must be physically directed toward this point "T." In this attitude, the positive phase of one generated cycle will first be received by microphone "A" which, as will be discussed later, generates an enabling signal "on" pulse, Pa. Within the time of this pulse width, the signal must be received by microphones "B," "C," and "D" and the relative times of reception at "B," "C," and "D" must be essentially coincident.

Figure 2A:
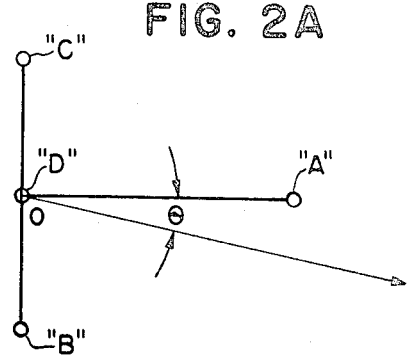
FIGURE 2A is a schematic view showing the relationship of the angle $\theta$ to the position of the microphones and the audio generator in plan. The angle $\theta$ is the deviation in degrees of the axial line "AO" from the precise direction of the audio generator where the line "OD" is the axis of rotation in plan for such deviation.

Because the critical angle in plan, or the maximum angular deviation from the precise direction of the base station which the direction finder may be directed and still produce or display an "on-course" signal (shown as angle θ in FIG. 2B), is a function of the relative physical position of the microphones "B" and "C" (dimension Y in FIG. 2A), the wave-length of the homing signal, and the pulse width generated by the electronic circuitry associated with each microphone; the degree of resolution is fixed by the choice of these parameters. To illustrate the effect of various choices upon resolution, consider FIGURE 4. Here the pulses Pa, Pb, Pc, and Pd generated in response to homing signal reception at points "A," "B," "C" and "D" are plotted as a function of angular deviation θ, from the precise direction of point "T." For this consideration, the angle φ is held constant at 0°. Dimension X of FIG. 2A is 0.3λ and the pulse width generated by the electronic circuitry associated with microphone circuit A (Pa) is 0.4λ. The pulse widths generated by the electronic circuitry associated with microphone circuits B (Pb), C (Pc), and D (Pd) are 0.07λ. (For purpose of clarity, units of time are related to equivalent units of wave-length.) Two series of curves are shown, one with the dimension Y equal to 0.1λ and the other with Y equal to 0.4λ. The critical angle, θc, is the angle at which Pb and Pc become non-coincident. Since θc is related to the dimension Y it can be seen in FIG. 4 that the critical angle is approximately ±20 degrees and ±5 degrees respectively for the two values of Y illustrated.

Figure 4:
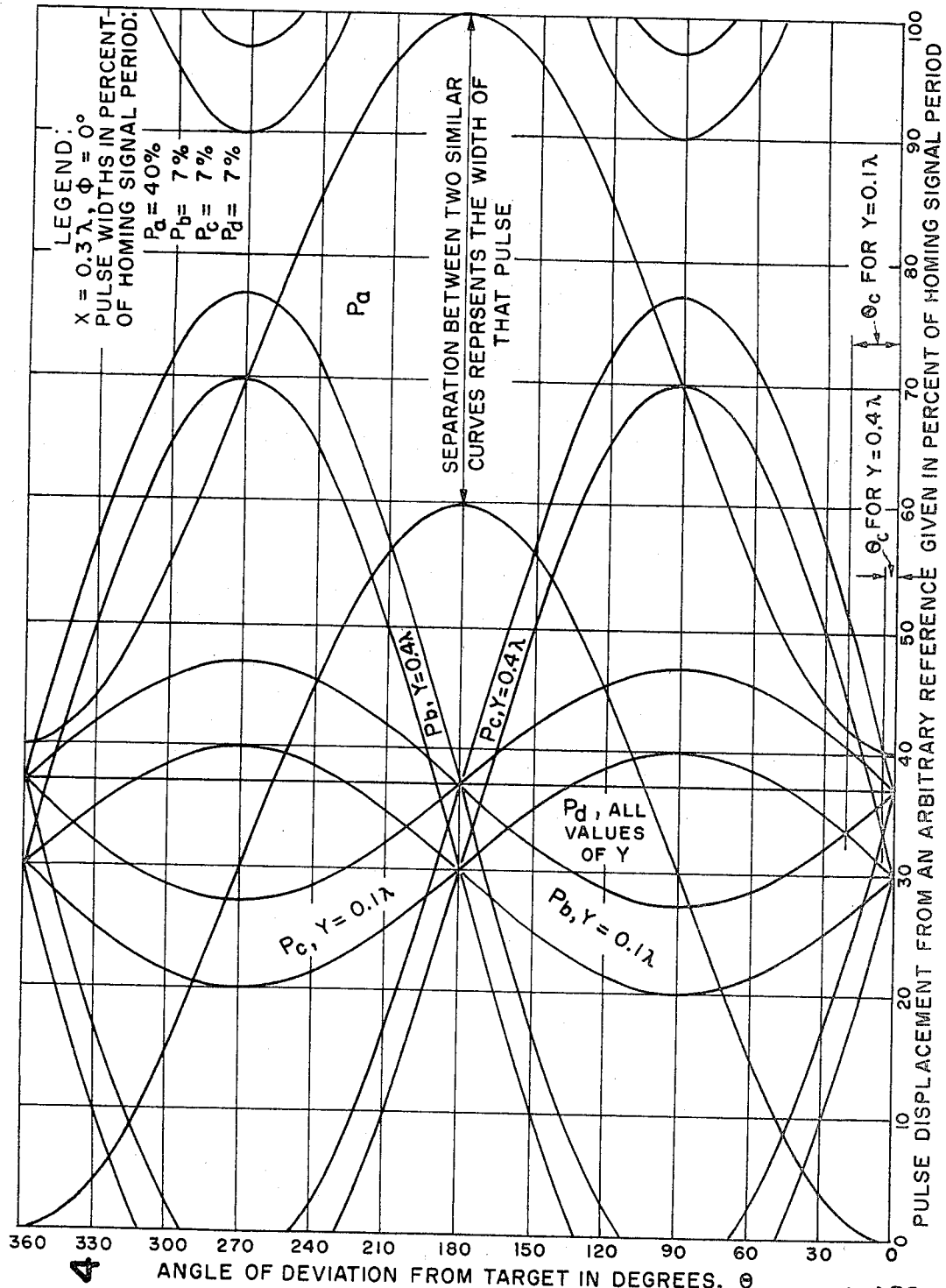
FIGURE 4 is a schematic view showing time-phase relationships of pulses P$a$, P$b$, P$c$ and P$d$ generated in response to audio signal reception and plotted as a function of the angular deviation of $\theta$ from the precise direction of the audio generator for the case where the angle $\phi$ is held constantly equal to 0°.

FIG. 7 depicts the time period relationship of the logic level pulses generated by the microphone circuits as the direction finder is rotated through 360° in plan with respect to the audio generator for the same conditions as FIGURE 4, except that only one choice of dimension Y is illustrated, namely Y=0.1γ.

The critical angle θc is also related to the pulse widths Pb and Pc (these should be nearly equal for an optimum design), and various degrees of resolution are similarly dictated by choice of these pulse widths. The critical angle θc decreases for decreasing pulse widths.

Figure 3:
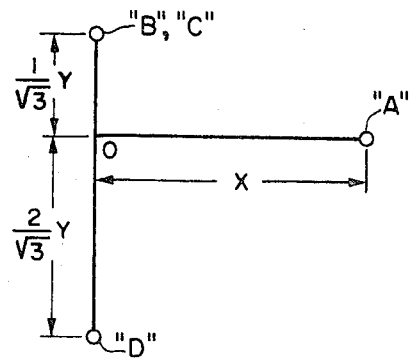
FIGURE 3 is a schematic view showing the relative positions of the microphones of the direction finder and the audio generator in side elevation.
Figure 2:
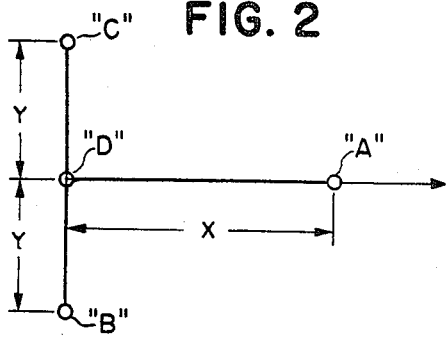
FIGURE 2 is a schematic view showing the relative positions of the microphones of the direction finder and the audio generator in plan.
Figure 3A:
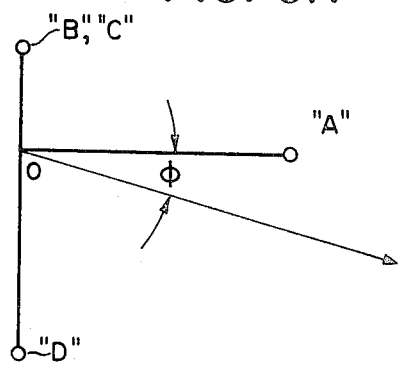
FIGURE 3A is a schematic view showing the relationship of the angle $\phi$ to the position of the microphones and the audio generator in side elevation. The angle $\phi$ is the deviation in degrees of the axial line "AO" from the precise direction of the audio generator where a line passing through the point "O" and parallel to the line "BC" is the axis of rotation in elevation for such deviation.
Figure 5:
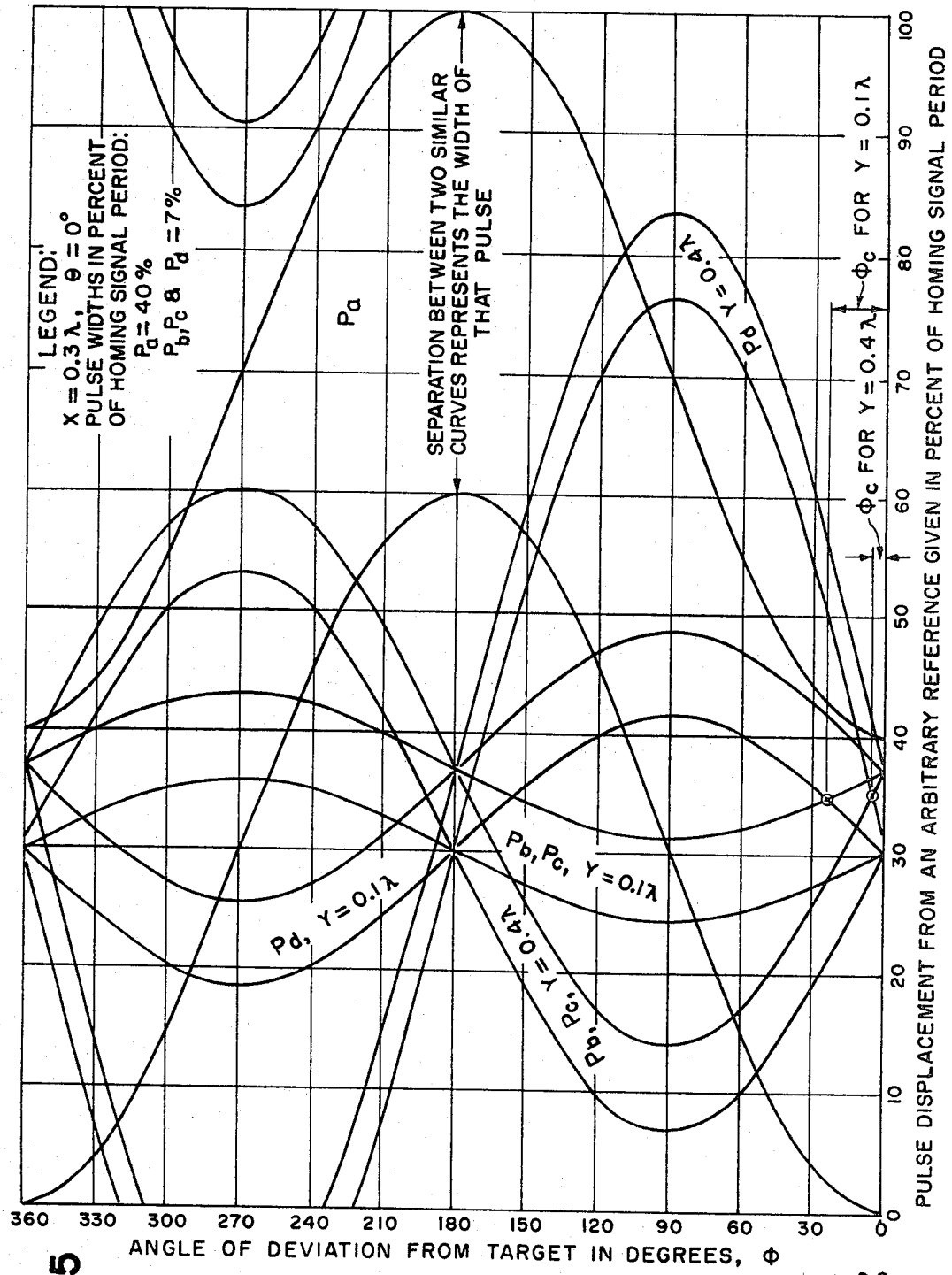
FIGURE 5 is a schematic view showing time-phase relationships of pulses P$a$, P$b$, P$c$, and P$d$ generated in response to audio signal reception and plotted as a function of the angular deviation of $\phi$ from the precise direction of the audio generator for the case where the angle $\theta$ is held constantly equal to 0°.

Similarly the critical angle in elevation (shown as angle φ in FIG. 3B) is a function of the relative physical position of the microphones "B," "C" and "D" (see FIG. 3A), the wave-length of the homing signal, and the pulse width generated by the electronic circuitry associated with each microphone; and the degree of resolution is fixed by the choice of these parameters. FIGURE 5 illustrates the effect of various choices similarly to FIGURE 4. Here the pulses Pa, Pb, Pc and Pd generated in response to homing signal reception at points "A," "B," "C," and "D" are plotted as a function of angular deviation φ from the precise direction of point "T." FIGURE 5 is plotted for the case where θ is held constant at 0° and thus pulses Pb and Pc are shown coincident. Dimension X of FIG. 3A is 0.3λ, and the pulse width generated by the electronic circuitry associated with microphone circuit A (Pa) is 0.4λ. The pulse width generated by the electronic circuitry associated with microphone circuits B (Pb), C (Pc), and D (Pd) are 0.07λ. (For purpose of clarity, units of time are related to equivalent units of wave-length.) Two series of curves are shown, one with the dimension Y equal to 0.1γ and the other with Y equal to 0.4λ.

The critical angle, φc, is the angle at which Pb, Pc and Pd become non-coincident. Since φc is related to the dimension Y it can be seen in FIG. 5 that the critical angle is approximately ±24 degrees and ±6 degrees respectively for the two values of Y illustrated.

FIG. 8 depicts the time period relationship of the logic level pulses generated by the microphone circuits as the direction finder is rotated through 360° in elevation with respect to the audio generator for the same conditions as FIGURE 5 except that only one choice of dimension Y is illustrated, namely Y=0.1 .

The critical angle φc is also related to the pulse widths Pb, Pc and Pd and choice of these pulse widths will effect the degree of resolution such that the critical angle will decrease for decreasing pulse widths.

From the above, it is obvious that the direction finder can be built so that the critical angles are selected single values or it can be built in such a manner that the critical angles can be adjusted by the user, allowing him to first use comparatively large angles for initial orientation and then smaller angles for more precise bearing.

Figure 6:
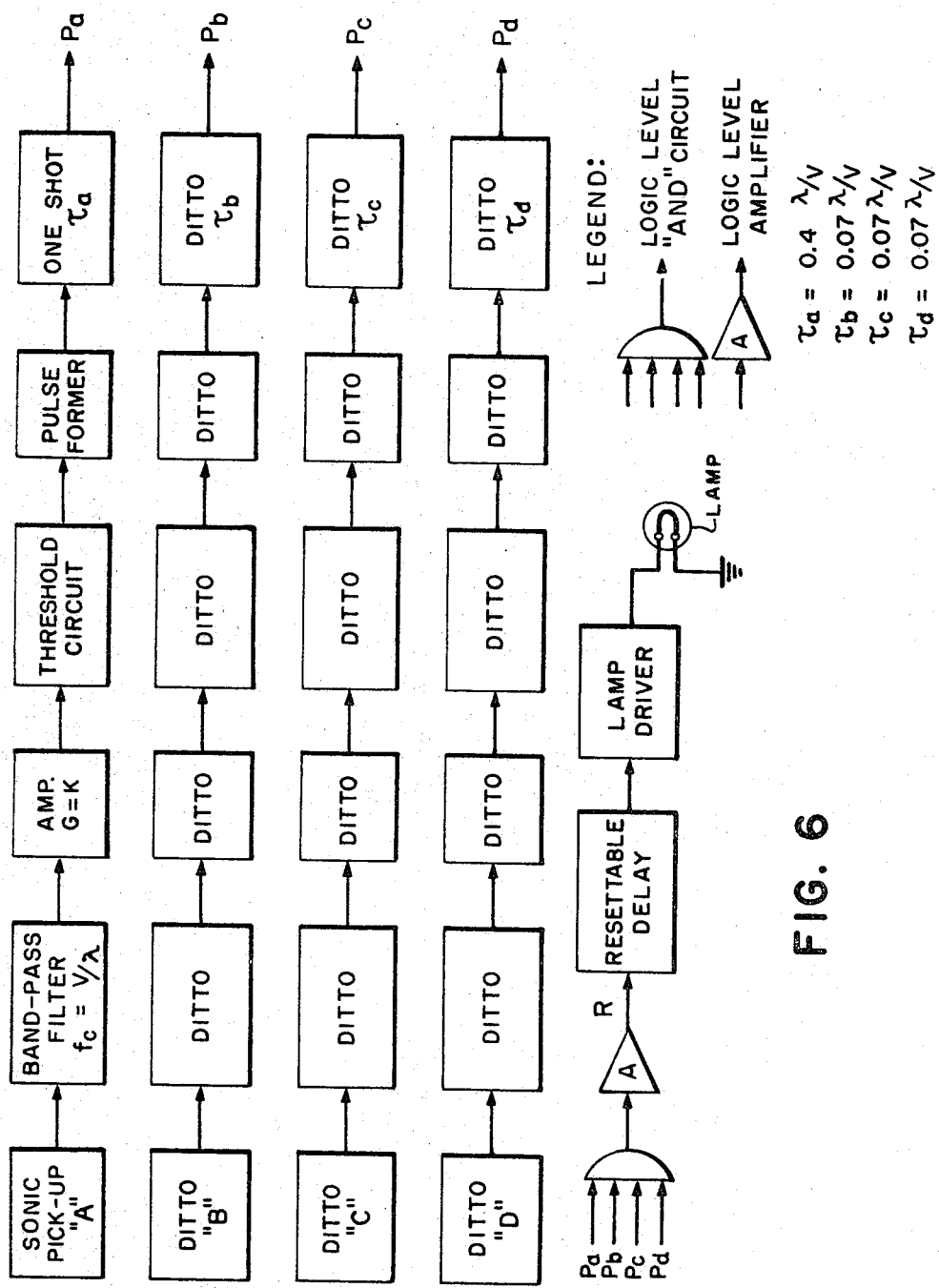
FIGURE 6 is a diagrammatic view of a preferred assembly of components of the direction finder.

FIG. 6 is a block diagram of a preferred embodiment of the direction finding unit. Depicted are the components of the unit and their respective arrangement. To one versed in the state of the art, it is obvious that specific circuit components and arrangement are a matter of designer's choice and many combinations can give equally satisfactory results.

The "Threshold Circuit" is, in effect, an automatic gain control. It maintains the signal at a suitable amplitude for proper detection, and at the same time, rejects unwanted background signals or noise by virtue of its amplitude discrimination.

The "Pulse Former" converts the sine wave signal transmitted from the microphone through the intermediary circuits (upon reception of a sonic signal) into a pulse by electronic switch action. The circuit may be similar to the familiar Schmitt trigger, but is not limited to this. The leading edge of the pulse thus formed triggers the following "one-shot" circuit (monostable multivibrators) which fixes the final pulse widths of Pa, Pb, Pc, and Pd as shown in FIGURES 4, 5, 7, and 8.

The amplifiers used throughout the circuit maintain a suitable signal level, this being standard practice.

The "resettable delay" is a well known electronic time delay switch. On reception of a pulse type signal, it "closes" and provides a continuous signal to the "Lamp Driver" for a period of time equal to its designed delay. For this application, this time will be greater than one cycle of the transmitted sonic signal, but less than two cycles. If, during the period of its delay time, the "resettable delay" receives another pulse signal, its timing mechanism will be reset and it will begin timing anew from that instant and the circuit will remain closed. Failure to receive a following pulse during the period of its delay time will result in the circuit "opening" until such time as further pulses are received at its input. Thus, receipt of one pulse each cycle is sufficient to cause the "resettable delay" to hold the lamp driver on. The "lamp driver" is an electronic switch or gate. While receiving a "closed" signal from the "resettable delay," it provides an electrical path for power suitable to operate the "on-course" signal lamp. The AND circuit and logic level amplifier are common logic function circuits which those skilled in the design of logic circuits and solid state electronics are familiar with.

Figure 9:
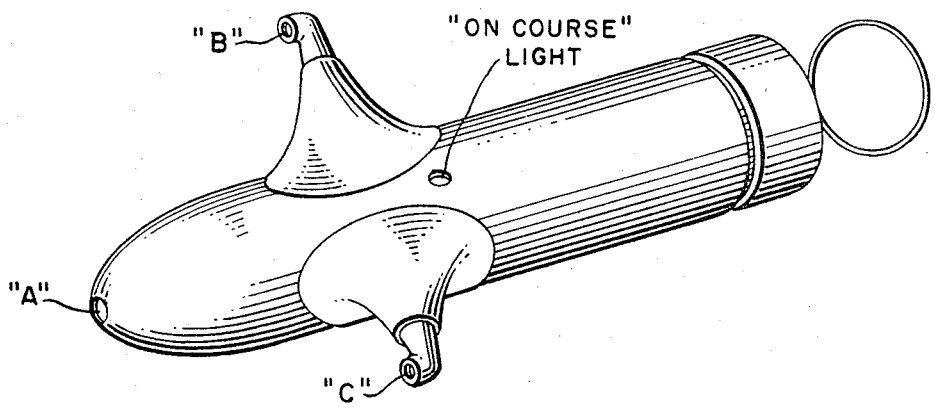
FIGURE 9 is an artist's conception of a suitable direction finder encased for use underwater with the positions of the microphones shown thereon.
Figure 10:
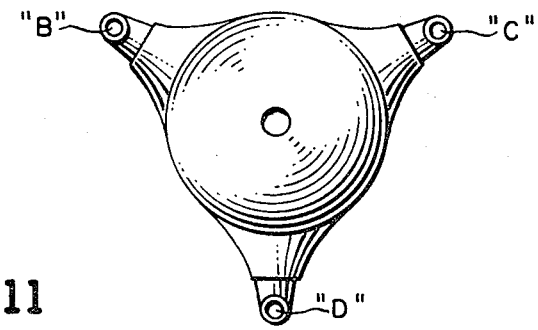
FIGURE 10 is a front view artist's conception of a suitable direction finder encased for use underwater with the positions of the microphones shown thereon.

FIGURE 9 is a concept of the direction finder package. Size and shape approximates that of a standard two cell flashlight, with the addition of the mounts for microphones B, C, and D. The ring at the rear is for attaching to a belt snap. Microphone A is mounted in the nose cone and the "on-course" light in the cylinder wall. The unit is completely "self contained." Many variations in the package are possible.

In principle, this same basic arrangement could be adapted for use in air rather than a water medium with any suitable packaging of the device being practical.

Referring to FIGURE 6 of the drawings, it will be seen that each microphone (termed the "Sonic Pick-Up") feeds to its indicated band-pass filter which latter is shown related to the sonic signal by $fc = V/\lambda$, where V is the signal velocity in the medium of transmission. The filtered wave is then fed to the indicated amplifier, to the Threshold Circuit, to the Pulse Former, to the "One Shot" and, as indicated at the "One Shot," outwardly as pulse $Pa$, $Pb$, $Pc$ or $Pd$, as the case may be.

The four pulse outputs are mixed, in the manner shown. Pulse outputs $Pa$, $Pb$, $Pc$ and $Pd$ are fed to and jointly mixed by a common Logic Level "AND" Circuit, followed by the action of a Logic Level Amplifier. The output of the Logic Level Amplifier is led by the Resettable Delay to a Lamp Driver.

The logic principle upon which the homing device is based is that the pulse $Pa$ must be received before either $Pb$, $Pc$, or $Pd$ and that the pulses $Pb$, $Pc$ or $Pd$ must be received essentially coincident in order to initiate the "on-course" signal. That is the principle demonstrated in FIGURES 4, 5, 7 and 8. This explains the reason for the particular method of pulse mixing. The "true" logic level signal (R) at the input to the "resettable delay" in FIGURE 6 is:

$$R = PaPbPcPd$$

Thus, the function R can only be "true" if $Pa$, $Pb$, $Pc$ and $Pd$ are coincident during some portion of their pulse widths.

The circuit now shown in FIGURE 6 is the preferred embodiment for this invention and is possible because of the choice of parameters $(x, y, Pa, Pb, Pc, Pd)$. This circuit forms directly the desired function:

$$R = PaPbPcPd$$

Figure 11:
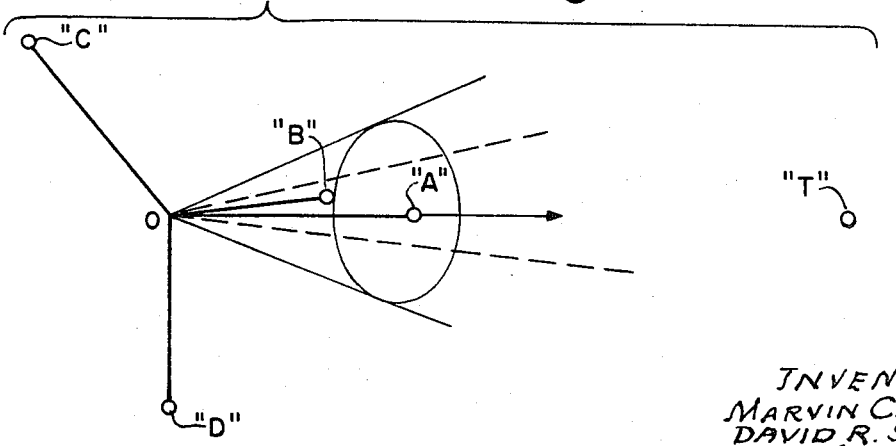
FIGURE 11 is a schematic isometric view showing the relative positions of the microphones of the direction finder and a point "T" and illustrating the "cone of critical resolution."

Referring to FIGURE 11, the "cone of critical resolution" is illustrated. This cone is formed with its apex at "O" by rotating the microphone "A" in a motion similar to a precession such that the boundaries of this cone define the degree of resolution of the direction to point "T" as determined by the direction finder. This cone is somewhat eliptical in cross section for the choice of parameters given in FIGURES 4 and 5, and is fixed only by the choice of parameters mentioned in relation to these figures. The cone may be thought of as describing a type of solid "critical angle."

It will be understood that the casing shown in FIGURE 9 will be provided with a manual switch arrangement for breaking the circuit from the source of power, and inasmuch as this is a common and well understood arrangement, particularly with respect to dry cell flashlight casings, it has not been illustrated in the drawings.

It should be understood that the direction finder as herein before described may be made to operate with fewer than the four microphones illustrated and described but its usefulness will be limited to a much larger cone of critical resolution.

Having described my invention, what I claim and desire to secure by Letters Patent is as follows:

1. A homing device adapted for response to a distant audio generated signal, comprising a portable casing, a plurality of sonic pickups in excess of three operatively associated with said casing including a first sonic pickup disposed forwardly of the others, said others being disposed rearwardly and angularly of said first pickup, and an "on-course" indicator, a sequential-simultaneous logic network adapted for battery operation including for each sonic pickup, and in sequence, means for amplifying and maintaining the signal to detection amplitude, means for converting the signal into a pulse by electronic switch action, and means for fixing the pulse widths, followed, in succession for each sonic pickup by means for mixing the plural pulse signals, a resettable time delay switch adapted to provide a continuous signal for a period of time equal to its delay, a signal device, and an electronic switch providing an electrical path for power required to operate said signal device, in which the casing carries the first sonic pickup at its forward end and carries three sonic pickups rearwardly and laterally thereof and mutually spaced along lines of equal angles lying in a common plane and radiating in divergent directions from a line extending from said first sonic pickup longitudinally of the casing and intersecting the plane of the three rearwardly disposed microphones at right angles.

References Cited

UNITED STATES PATENTS 2,721,315   10/1955   Snyder _____ 340—6

RICHARD A. FARLEY, Primary Examiner

U.S. Cl. X.R.

340—16